United States Patent
Zhao et al.

(10) Patent No.: US 9,709,712 B2
(45) Date of Patent: Jul. 18, 2017

(54) DOUBLE-VISION BACKLIGHT MODULE AND LIQUID CRYSTAL DISPLAY DEVICE

(71) Applicant: BOE TECHNOLOGY GROUP CO., LTD., Beijing (CN)

(72) Inventors: Xingxing Zhao, Beijing (CN); Jinye Zhu, Beijing (CN); Wenjie Jiang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 11 days.

(21) Appl. No.: 14/939,342

(22) Filed: Nov. 12, 2015

(65) Prior Publication Data

US 2016/0061999 A1    Mar. 3, 2016

Related U.S. Application Data

(62) Division of application No. 14/084,296, filed on Nov. 19, 2013, now Pat. No. 9,217,815.

(30) Foreign Application Priority Data

Nov. 20, 2012   (CN) .......................... 2012 1 0473031

(51) Int. Cl.
*G02F 1/1335*   (2006.01)
*G02B 5/04*   (2006.01)
(Continued)

(52) U.S. Cl.
CPC .......... *G02B 5/045* (2013.01); *G02B 6/0053* (2013.01); *G02B 27/2214* (2013.01); *G02F 1/133504* (2013.01); *H04N 13/0404* (2013.01)

(58) Field of Classification Search
CPC ............................. G02B 5/045; G02B 6/0053
(Continued)

(56) References Cited

U.S. PATENT DOCUMENTS 5,724,108 A * 3/1998 Shibata ............... G02B 6/0053
349/62
2004/0263698 A1   12/2004 Nam et al.
(Continued)

FOREIGN PATENT DOCUMENTS

CN           1607418 A      4/2005
CN         101329032 A    12/2008
(Continued)

OTHER PUBLICATIONS

Fourth Chinese Office Action dated Dec. 28, 2015; Appln. No. 201210473031.X.
(Continued)

*Primary Examiner* — Sang V Nguyen
(74) *Attorney, Agent, or Firm* — Ladas & Parry LLP

(57) ABSTRACT

In the embodiments of the invention, a double-vision backlight module and a LCD device are provided. In the embodiments of the present invention, a light-splitting prism sheet is disposed between a diffuser plate and a LCD panel for splitting light. The prism sheet is arranged such that a side having prisms thereon of the prism sheet faces the LCD panel, and thereby splitting the light and enhancing the brightness, and eventually enhancing the brightness in both left and right view areas and at the same time reducing the brightness in the central-interference area, and thus improving the double-vision effect.

4 Claims, 3 Drawing Sheets

(51) Int. Cl.
  *G02B 27/22* (2006.01)
  *H04N 13/04* (2006.01)
  *F21V 8/00* (2006.01)

(58) Field of Classification Search
  USPC .......................................................... 349/57
  See application file for complete search history.

(56) References Cited

U.S. PATENT DOCUMENTS

| | | | |
|---|---|---|---|
| 2006/0056166 | A1 | 3/2006 | Yeo et al. |
| 2008/0049282 | A1 | 2/2008 | Moss |
| 2009/0103008 | A1* | 4/2009 | Nasu .................... G02B 6/0053 349/64 |
| 2009/0174919 | A1* | 7/2009 | Moss .................... G02B 27/225 359/23 |
| 2011/0141765 | A1* | 6/2011 | Chang .................... G02B 5/045 362/606 |
| 2011/0221999 | A1 | 9/2011 | Shiau et al. |
| 2011/0228387 | A1 | 9/2011 | Shiau et al. |
| 2011/0273643 | A1* | 11/2011 | Arai .................... G02F 1/133528 349/64 |
| 2012/0188788 | A1 | 7/2012 | Kim et al. |

FOREIGN PATENT DOCUMENTS

| | | |
|---|---|---|
| GB | 2405543 A | 3/2005 |
| GB | 2405543 A | 3/2005 |
| WO | 2005/071474 A2 | 6/2005 |
| WO | 2005/071474 A2 | 8/2005 |
| WO | 2010/036415 A1 | 4/2010 |

OTHER PUBLICATIONS

Extended European Search Report dated Aug. 5, 2014; Appln. No. 13193623.9-1562/2733527.
EPO Communication dated Jul. 8, 2015; Appln. No. 13 193 623.9-1562.
USPTO Corrected Notice of Allowability dated Sep. 8, 2015 in connection with U.S. Appl. No. 14/084,296.
Fourth Chinese Office date Dec. 28, 2015; Appln. No. 201210473031.X.
European Patent Office Action dated Mar. 1, 2016; Appln. No. 13 193 623.9-1562.
Partial European Search Report dated Mar. 27, 2014; Appln. No. 13193623.9-1562.
Extended European Search Report dated May 8, 2014; Appln. No. 13193623.9-1562/2733527.
EPO Communication dated Aug. 7, 2015; Appln. No. 13 193 623.9 -1562.
First Chinese Office Action Aug. 5, 2014; Appln. No. 201210473031.X.
Second Chinese Office Action dated Jan. 28, 2015; Appln. No. 201210473031.X.
Third Chinese Office Action dated Jun. 18, 2015; Appln. No. 201210473031.X.
USPTO RR dated Mar. 2, 2015 in connection with U.S. Appl. No. 14/084,296.
USPTO NFOA dated May 1, 2015 in connection with U.S. Appl. No. 14/084,296.
USPTO NOA mailed Aug. 17, 2015 in connection with U.S. Appl. No. 14/084,296.
USPTO Corrected Notice of Allowabilify dated Sep. 8, 2015 in connection with U.S. Appl. No. 14/084,296.

* cited by examiner

DOUBLE-VISION BACKLIGHT MODULE AND LIQUID CRYSTAL DISPLAY DEVICE

FIELD OF THE ART

The present disclosure relates to autostereoscopic 3D technology, and more particularly, relates to a double-vision backlight module and a liquid crystal display (LCD) device.

BACKGROUND

The application of autostereoscopic 3D (also known as glasses-free 3D) double-vision (also known as dual field of view (FOV)) display technology, as a novel display technology, is more and more popular.

An autostereoscopic 3D double-vision display has two view areas on a display screen, that is, left and right view areas, which may display different images at the same time. Generally, a left FOV image is displayed on the left view area and a right FOV image is displayed on the right view area such that different viewers may see different images on different directions of the same display. However, there is a central-interference area, as illustrated in FIG. 1, between the left and right view areas, in the central-interference area, both left and right FOV images are visible, and this may degrade the display effect.

In the prior art, the central-interference area is reduced by modifying the double-vision display panel. However, the central-interference area cannot be eliminated completely. The central-interference area has high brightness, which will still degrade the display effect.

SUMMARY

An objective of the present disclosure is to provide a double-vision backlight module and a LCD device, to solve the problem caused by the high brightness of the central-interference area which may degrade the display effect.

The objective of the present disclosure is realized with the following technical solutions.

A first aspect of the present disclosure provides a double-vision backlight module, comprising a non-parallel backlight source and a diffuser plate, wherein the backlight module further comprises at least two prism sheets disposed between the diffuser plate and a LCD panel, the at least two prism sheets are superimposed along the vertical direction, axes of the prism sheets are vertical to a horizontal line connecting left and right view areas, and axes of prism sheets are parallel to each other, wherein, a first prism sheet adjacent to the diffuser plate is arranged such that a side having the prisms thereon of the first prism sheet faces the LCD panel, and the first prism is adapted for converging light incident from the non-parallel backlight source, prism sheets other than the first prism sheet are adapted for splitting the converged light stage by stage and converging the split light in the left and right view areas.

Another aspect of the present disclosure further provides a double-vision backlight module, comprising a parallel backlight source and a diffuser plate, wherein the backlight module further comprises a prism sheet disposed between the diffuser plate and a LCD panel, and the prism sheet is adapted for splitting light incident from the parallel backlight source and converging the split light into the left and/or right view areas, wherein, the prism sheet is arranged such that a side having the prisms thereon of the prism sheet faces the LCD panel, axes of the prisms are vertical to a horizontal line connecting the lift and right view areas, and a prism base angle of the prism sheet is smaller than arcsin (1/n), wherein n is the refractive index of the prisms.

The present disclosure further provides a LCD device comprising the above backlight module.

By arranging the prism sheet such that the side having the prisms thereon of the prism sheet faces the LCD panel, the double-vision backlight module as provided by the embodiments of the invention effectively enhances the brightness while splits the light, display brightness of the images in the left and right view areas is increased, and the backlight brightness in the interference area is reduced, which in turn reduces the brightness of the images in the central-interference area and the central-interference, thereby improving the image display effect.

DETAILED DESCRIPTION

According to the embodiments of the invention, a double-vision backlight module is provided. By arranging prism sheets between a diffuser plate and a LCD panel such that the prism sheets split light and enhance brightness of the two view areas, so as to enhance the brightness of the two view areas and reduce brightness of a central-interference area. As a result, the central-interference is reduced and the double-vision display effect is improved.

Figure 1:
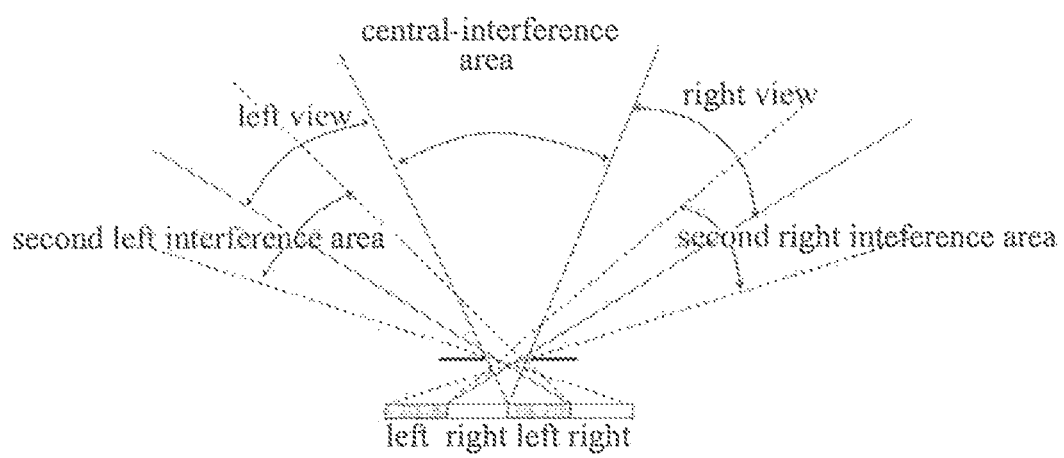
FIG. 1 schematically illustrates a double-vision display image with a central-interference area existing between the left and right view areas of the prior art.
Figure 2:
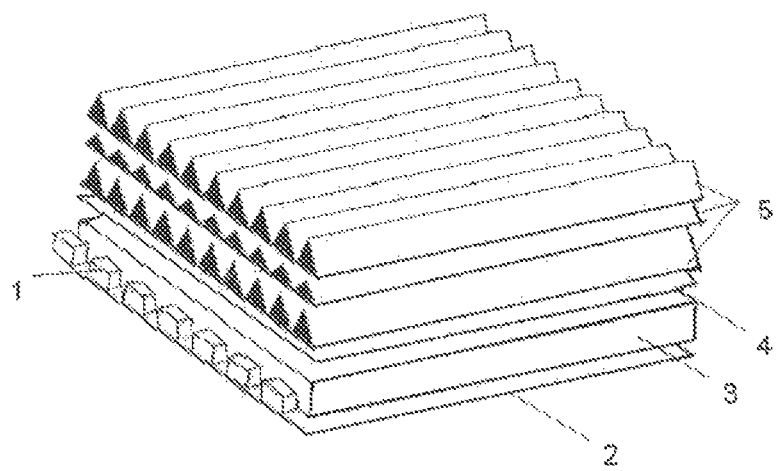
FIG. 2 schematically illustrates a configuration of a double-vision backlight module in accordance with Embodiment 1 of the invention.

A schematic configuration of a double-vision backlight module in accordance with Embodiment 1 of the invention is illustrated in FIG. 2, which comprises a light source a reflector plate 2, a light guide plate (LOP) 3, a diffuser plate 4 and prism sheets 5.

The light source 1, the reflector plate 2 and the LOP 3 constitute a non-parallel backlight source, and the light source 1 is preferably a LED source.

Specifically; the prism sheets 5 are disposed between the diffuser plate 4 and a LCD panel, Moreover, in the embodiment of the invention, there are at least two layers of prism sheets 5 such that light-splitting function can be realized. A first prism sheet that is adjacent to the diffuser plate 4 is arranged such that a side having prisms thereon of the first prism sheet faces a side of the LCD panel, and the first prism sheet is adapted for converging light incident from the non-parallel back light source; prism sheets other than the first prism sheet are adapted for splitting the converged light stage by stage and focusing the split light into the left and/or right view areas.

Specifically, in an embodiment of the invention, at least two prism sheets disposed between the diffuser plate 4 and the LCD panel are superimposed along the vertical direction, and axes of the prisms are parallel to each other and vertical to a horizontal line connecting the left and right view areas.

In the double-vision backlight module as provided by the embodiment of the invention, the display brightness of the view area images is significantly improved and the brightness of the backlight in the interference area is reduced by arranging the prism sheet that is adjacent to the diffuser plate such that the side having the prisms thereon of that prism sheet faces the LCD panel and by means of the combination of the prism sheets which firstly converges light and then splits the light, which in turn reduces brightness of images in the central-interference area and thereby improving the image display effect.

A backlight module in accordance with Embodiment 2 of the invention is a preferable variant of Embodiment 1 and is not limitative to the invention.

Figure 3:
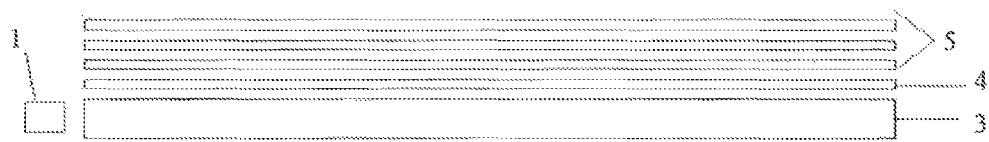
FIG. 3 schematically illustrates a configuration of a double-vision backlight module in accordance with Embodiment 2 of the invention.

In the embodiment of the invention, preferably, three layers of prism sheets are arranged. FIG. 3 schematically illustrates a cross section of the backlight module with three prism sheets.

In an embodiment of the invention, the three prism sheets 5 are disposed parallel with each other between the diffuser plate 4 and the LCD panel, and all the prism sheets are arranged such that the sides having the prisms thereon of those prism sheets face the LCD panel. Axes of the prisms in each prism sheets are parallel to each other and vertical to a horizontal line connecting the left and right view areas.

Specifically, to achieve a better light-splitting effect, in accordance with a preferable embodiment of the invention, the first layer of prism sheet disposed adjacent to the diffuser plate has such a prism apex angle that keeps a beam angle of the light incident from the non-parallel back light source to a range of no greater than 45°, so as to converge more split light into the two view areas, and thereby further improve the display brightness of the two view areas and reduce the brightness of the central-interference area.

Figure 4:
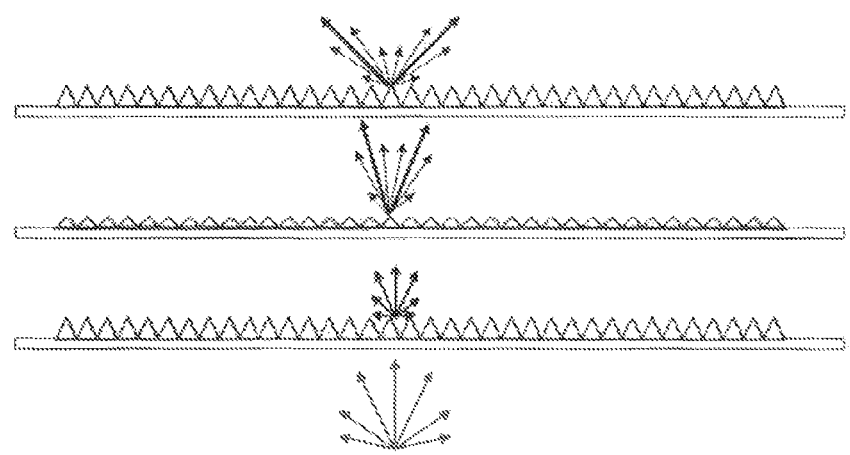
FIG. 4 schematically illustrates light-splitting effect realized by three prism sheets in accordance with Embodiment 2 of the invention.

Preferably, in accordance with the embodiment of the invention, the apex angle of the prisms of the first layer of prism sheet disposed adjacent to the diffuser plate is set between 28°~42°, and the first layer of prism sheet converge light emitted from the non-parallel backlight source, and the beam angel of the light incident from the non-parallel backlight source is controlled within a range of no greater than 45°. For the purpose of maintaining the brightness of the split light while converging the light into the two view area stage by stage, the second prism sheet is arranged such that the prism apex angle of the second prism sheet is between 114°~22°, so as to split the light converged by the first prism sheet for the first time (hereafter also refers to as first splitting). The third prism sheet that is disposed adjacent to the LCD panel is arranged such that the prism apex angle of the third prism sheet is between 28°~42°, so as to split the light that has experienced the first splitting again, and thereby to widen the angle of light splitting. FIG. 4 schematically illustrates light-splitting effect realized by the aforesaid three prism sheets. A conventional non-parallel backlight source may emit light beams at all angles; however, the light beams are converged to the left and/or right view area after being split by the aforesaid three prism sheets, and there may be hardly any light beam that is converged to the central-interference area. Thus, the brightness of the left and right view areas is increased and that of the central-interference area is decreased, and thereby reducing central-interference and improving the double-vision effect.

Preferably, prisms of the prism sheets in accordance with an embodiment of the invention may be shaped as isosceles triangle such that the brightness is distributed symmetrically.

More preferably, in an embodiment of the invention, the prism apex angles of the first and third prism sheets are equal to each other, so that the fabrication process is simplified and at the same time light-splitting effect is achieved.

Figure 5:
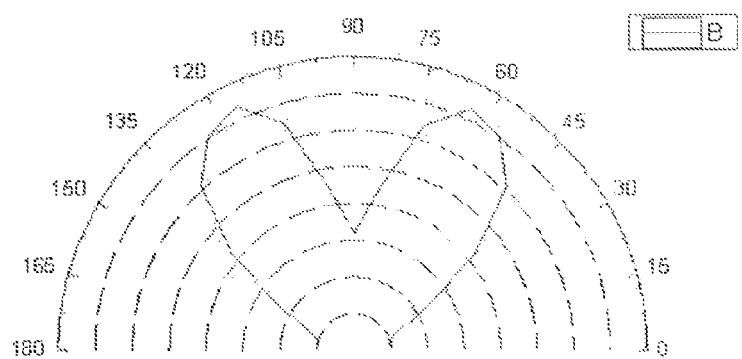
FIG. 5 schematically illustrates a cross sectional polar coordinate diagram of a light filed distribution of a double-vision backlight after light-splitting in accordance with Embodiment 2 of the invention.

Furthermore, in accordance with an embodiment of the invention, the prism apex angles of the first and third prism sheets may be set to 40°, and the prism apex angle of the second prism sheet may be set to 120°, such the split light is converged to an area between ±14°~±45°, which is an optimal brightness area for viewing the displayed images. FIG. 5 schematically illustrates a cross sectional polar coordinate diagram of the double-vision backlight light field distribution after light-splitting.

With the combination of the three prism sheets in accordance with the embodiment of the invention, the first prism sheet converging the light, the second prism sheet splitting light in a small angle and the third prism sheet splitting the light in a wider angle based on the small-angle splitting, the brightness is improved while the light-splitting effect for optimal view area is realized.

Furthermore, in order to further improve the brightness of the display area, a converging prism sheet having its prism axis parallel to a line horizontally connecting the left and right view areas may be disposed above the prism sheet most close to the LCD panel. The converging prism sheet is disposed between the prism sheet most close to the LCD panel and the LCD panel, and is superimposed with the prism sheet most close to the LCD panel in the vertical direction, so as to further improve the brightness of the display area.

In the double-vision backlight module in accordance with the embodiment of the invention, with the combination of three prism sheets with different prism apex angles together with the converging prism sheet disposed on the prism sheets, the display brightness of the left and right view areas is increased and at the same time the brightness is further improved by the converging prism sheet.

Embodiment 3 of the invention further provides a double-vision backlight module comprising a backlight source, wherein the backlight source is a parallel backlight source. With respect to the parallel backlight source, prism sheets may also be disposed between the diffuser plate and the LCD panel, so as to split the light incident from the parallel backlight source and converge the split light into the left and/or right view areas.

Specifically, the prism sheet is arranged such that a side having the prisms thereon of the prism sheet faces the LCD panel, axes of the prisms are vertical to a horizontal line connecting the left and right view areas, and a base angle of prisms in the prism sheet is smaller than arcsin (1/n), wherein n is the refractive index of the prisms.

Figure 6:
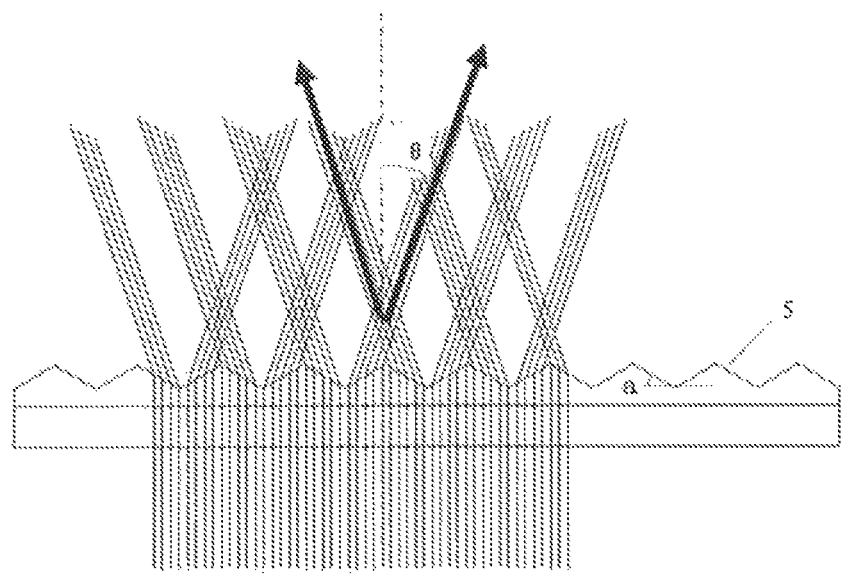
FIG. 6 schematically illustrates light-splitting effect on a parallel backlight source realized by isosceles triangular prism sheets in accordance with Embodiment 3 of the invention.

More preferably, as the light incident from the parallel backlight source is unidirectional, only one prism sheet is required to realize light splitting. Therefore, the double-vision backlight module as provided by the Embodiment 3 of the invention differs from Embodiments 1 and 2 in that the backlight source of the double-vision backlight module is a parallel backlight source and light splitting may be realized by disposing only one prism sheet 5 between the diffuser plate 4 and the LCD panel, as illustrated in FIG. 6. Meanwhile, the prism sheet is arranged such that a side having the prisms thereon of the prism sheet faces the LCD panel. For the purpose of splitting the viewing angles, base angles of the prism sheet 5 in this embodiment of the invention should be smaller than arcsin (1/n), wherein a is the refractive index of the prisms.

Preferably, in the embodiment of the invention, to set the angle of the prism sheet 5 based on the required splitting angle of the split light, the relationship between the splitting angle of the light split by the prism sheet and the prism base angle should meet the following function:

$$\sin(\theta) = n \cdot \sin a;$$

where 'a' is the prism base angle of the prism sheet, 'θ' is the splitting angle of the light split by the prism sheet, and 'n' is the refractive index of the prisms.

Specifically, when the prisms of the prism sheet 5 are non-isosceles triangle shaped or isosceles triangles shaped, the prism base angle may be set according to the above relationship between the splitting angle and the prism apex angle of the prism sheet.

Figure 7:
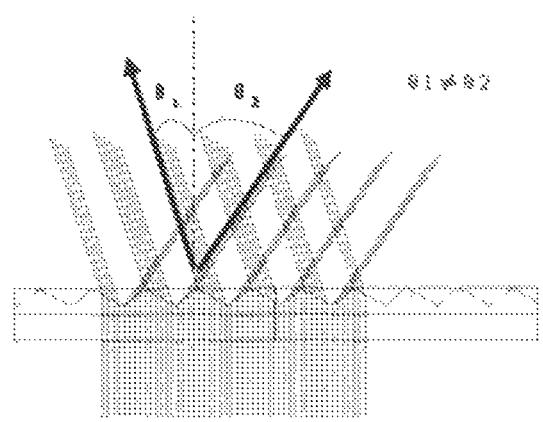
FIG. 7 schematically illustrates light-splitting effect on the parallel backlight source realized by nonisosceles triangular prism sheets in accordance with Embodiment 3 of the invention.

Preferably, when the prisms of the prism sheet 5 are non-isosceles triangle shaped, the light splitting will be unsymmetrical. As illustrated in FIG. 7, light splitting angles θ1 and θ2 are not equal to each other, and they depend on the base angles of the triangles, respectively. Therefore, the prisms of the prism sheet 5 in the embodiment of the invention are preferably isosceles triangles so as to realize symmetrical light splitting.

More preferably, for the purpose of enhancing the brightness, a converging prism sheet with its axis parallel to a horizontal line connecting the left and right view areas may also be disposed between the prism sheet 5 and the LCD panel and superimposed on the prism sheet that is most close to the LCD panel in the vertical direction.

In the double-vision backlight module as provided by the embodiment of the invention, the backlight source thereof is modified, and thus only one prism sheet is required to enhance the brightness while realizing splitting effect. That is, the brightness of the central-interference area is eventually reduced and that of the two view areas enhanced. Even if there is interference in the central-interference area, the display image will not be seriously degraded because the brightness of the central interference area is relatively low, and thereby the double-vision display effect is improved.

Embodiment 4 of the invention thither provides a LCD device. The LCD device comprises the same backlight module as that described in Embodiments 1, 2 and 3. The rest part of the LCD device has a conventional configuration and will not be elaborated here.

What are described above is related to the illustrative embodiments of the disclosure only and not imitative to the scope of the disclosure; the scopes of the disclosure are defined by the accompanying claims.

The invention claimed is:

1. A double-vision backlight module of an autostereocopic 3-dimensional (3D) display, comprising a parallel backlight source which is a composite white light source irradiating a pattern of a plurality of parallel light rays and a diffuser plate, wherein the double-vision backlight module further comprises a prism sheet disposed between the diffuser plate and a LCD panel, the prism sheet includes a plurality of prisms for splitting light incident from the composite white light source and converging the split light into the left and right view areas, wherein, the prism sheet is arranged such that the plurality of parallel light rays irradiated from the white light source covers at least the plurality of prisms, and a side having the plurality of prisms thereon of the prism sheet faces the LCD panel, axes of the plurality of prisms are vertical to a horizontal line connecting the left and right view areas, and a prism base angle of the prism sheet is smaller than arcsin (1/n), wherein n is the refractive index of the plurality of prisms.

2. The double-vision backlight module of claim 1, wherein a relationship between the splitting angle of the light split by the prism sheet and the prism base angle of the prism sheet meets:

$$\sin(\theta) = n \cdot \sin a;$$

where a is the prism base angle of the prism sheet, θ is the splitting angle of the light split by the prism sheet, and n is the refractive index of the prisms.

3. The double-vision backlight module of claim 1, wherein the prisms of the prism sheet are isosceles triangle shaped.

4. The double-vision backlight module of claim 3, further comprises a converging prism sheet, prism axis of the converging prism sheet being parallel to the horizontal line connecting the left and right view areas, the converging prism sheet being disposed between the prism sheet and the LCD panel and superimposed on the prism sheet in the vertical direction.

* * * * *